(12) United States Patent
Kato et al.

(10) Patent No.: US 8,352,704 B2
(45) Date of Patent: Jan. 8, 2013

(54) SWITCHING APPARATUS AND DATA MANAGEMENT METHOD OF SAME

(75) Inventors: Hitoshi Kato, Sagamihara (JP); Shuichi Sato, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/283,333

(22) Filed: Oct. 27, 2011

(65) Prior Publication Data

US 2012/0166755 A1 Jun. 28, 2012

(30) Foreign Application Priority Data

Dec. 27, 2010 (JP) .................................. 2010-291303

(51) Int. Cl.
*G06F 12/00* (2006.01)
(52) U.S. Cl. ......... 711/203; 711/162; 711/170; 711/200
(58) Field of Classification Search .................. None
See application file for complete search history.

(56) References Cited

U.S. PATENT DOCUMENTS 5,771,386 A 6/1998 Baumbauer

FOREIGN PATENT DOCUMENTS

| JP | 64-47199 | 2/1989 |
| JP | 02-245842 | 10/1990 |
| JP | 05-225108 | 9/1993 |
| JP | 09-511351 | 11/1997 |
| JP | 2000-242550 | 9/2000 |

*Primary Examiner* — Shawn X Gu
(74) *Attorney, Agent, or Firm* — Blakely, Sokoloff, Taylor & Zafman LLP

(57) ABSTRACT

According to one embodiment, a switching apparatus includes a storage module, a setting module, a managing module and a reconstruction module. The storage module stores data pertaining to the switching function by dividing the data into a plurality of groups. The setting module sets, for each of the plurality of groups, a base address to be allocated by an operating system when the program is started up. The managing module records and manages the base address and data size information of each group when the program is terminated. The reconstruction module, when the program is started up, refers to the base address and the data size information recorded when the program is terminated last time, and reconstructs data in the virtual memory space for each of the plurality of groups based on a reference result.

4 Claims, 5 Drawing Sheets

SWITCHING APPARATUS AND DATA MANAGEMENT METHOD OF SAME

CROSS-REFERENCE TO RELATED APPLICATIONS

This application is based upon and claims the benefit of priority from prior Japanese Patent Application No. 2010-291303, filed Dec. 27, 2010, the entire contents of which are incorporated herein by reference.

FIELD

Embodiments described herein relate generally to a switching apparatus and a data management method of the same.

BACKGROUND

Conventional telephone switching apparatuses are embedded systems. That is, the function of the switching apparatus is implemented by executing dedicated telephone switching software on dedicated hardware. On the other hand, there is a trend of providing the switching apparatus as a general purpose system. An apparatus of this kind implements the switching apparatus function by executing telephone switching software on a general purpose computer on which a general purpose operating system is running. Under the circumstance, needs for sharing the telephone switching software by the embedded system and general purpose system are increasing.

In embedded systems, data necessary for the operation are stored by allocating physical addresses in a nonvolatile memory (a flash memory or a memory backed up by a power supply). By contrast, in general purpose systems, data are stored by allocating logical addresses in a volatile memory or in virtual address spaces using swap area of a hard disk. That is, data must be allocated to logical addresses managed by the general purpose OS in order to port the embedded software to the general purpose system.

A case like this is generally handled by using a memory mapped file. In the general purpose system, however, a logical address into which the memory mapped file is to be loaded is uncertain. Accordingly, the general purpose system cannot function if data that refers to an absolute address is defined in the embedded software of the porting source. In the general purpose system, therefore, the absolute address is rewritten into a relative address when the system is started up, i.e., booted.

In a switching apparatus, however, various kinds of resources such as extension lines and trunk circuits exist. This makes the number of types of data enormous as well as the data amount itself. Therefore, it takes a long time to execute the procedure of rewriting a logical address allocated to each data by the general purpose OS into a base address. Since this procedure is performed when the program is started up, the start up of the system is time consuming. Also, if the size of given data increases, the addresses of all data after this data change in the address space. This further prolongs the start up time.

As described above, the needs for porting software of the embedded system to the general purpose system exist in this technical field. However, address conversion takes a long time and this prolongs the start up time of the system, so demands have arisen for some measures.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a switching apparatus includes a storage module, a setting module, a managing module and a reconstruction module. The storage module stores data pertaining to the switching function by dividing the data into a plurality of groups. The setting module sets, for each of the plurality of groups, a base address to be allocated by an operating system when the program is started up. The managing module records and manages the base address and data size information of each group when the program is terminated. The reconstruction module, when the program is started up, refers to the base address and the data size information recorded when the program is terminated last time, and reconstructs data in the virtual memory space for each of the plurality of groups based on a reference result.

Figure 1:
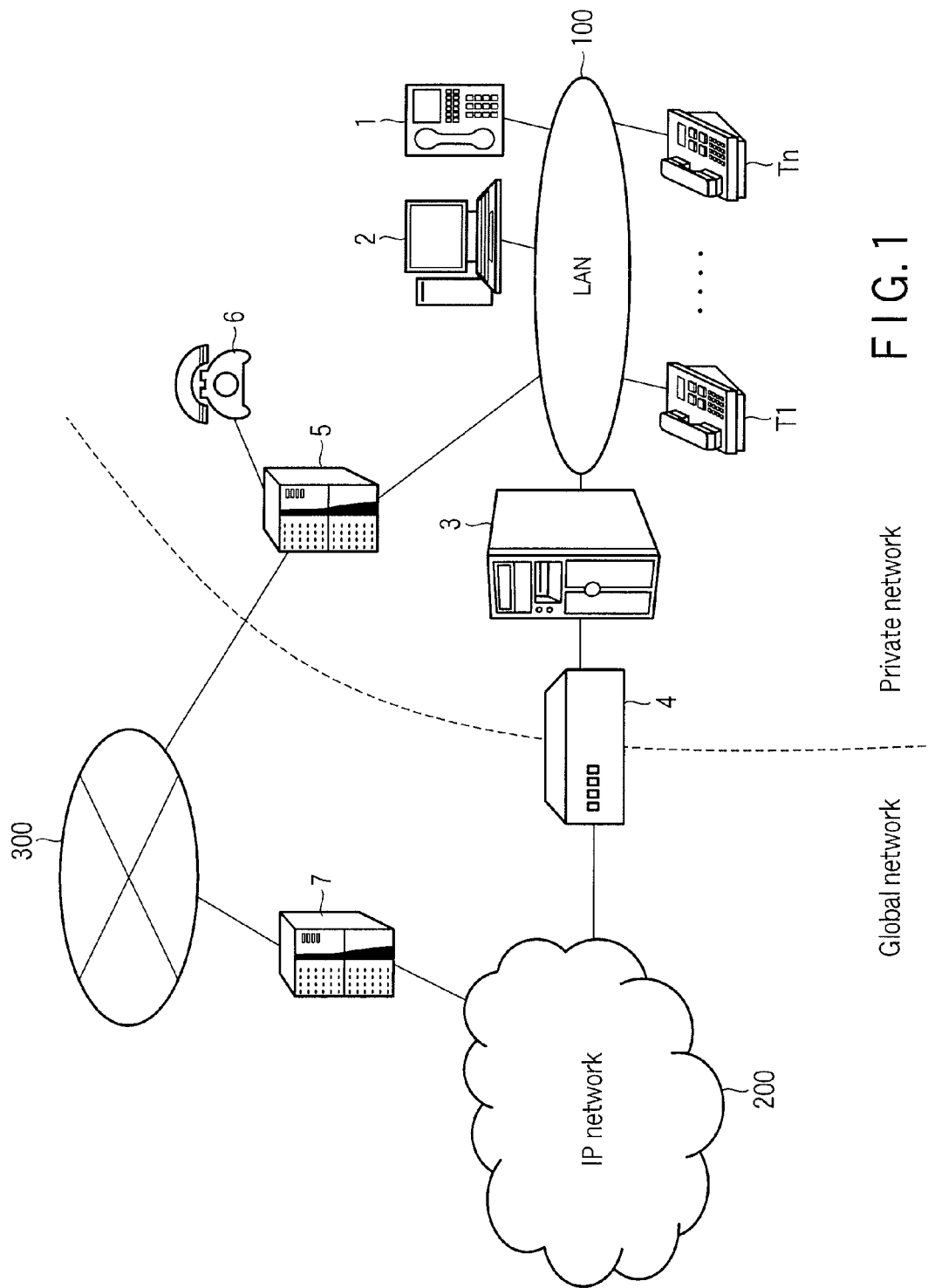
FIG. 1 is an exemplary view showing an example of a system including a switching apparatus according to an embodiment.

FIG. 1 is an exemplary view showing an example of a system including a switching apparatus according to an embodiment. This embodiment takes, as an example, a so called Voice over IP (VoIP) system that achieves voice communication by Internet Protocol (IP).

Referring to FIG. 1, a private network includes a Local Area Network (LAN) 100. The LAN 100 is connected to, e.g., IP terminals T1 to Tn, a multifunction telephone 1, a telephone terminal such as a softphone 2, a switching apparatus 3, and a gateway 5. The switching apparatus 3 is connected to an IP network 200 as a global network via a Network Address Translation (NAT) router 4. The gateway 5 is connected to a public switched telephone network (PSTN) 300 of the global network. A telephone terminal 6 may be connected to the gateway 5.

The IP network 200 and PSTN 300 are connected to each other via a gateway 7. This enables mutual communication between the LAN 100, IP network 200, and PSTN 300. The switching apparatus 3 controls extension line conversation between telephone terminals in the private network, and outside line conversation performed via the NAT router 4 and gateway 5.

The switching apparatus 3 implements a switching function by IP packet routing. The switching apparatus 3 is obtained by installing a telephone communication switching program in an electronic apparatus such as a general purpose computer server. The switching apparatus 3 implements a switching function by executing the switching program. An example of a protocol for implementing the telephone switching program is a so called Session Initiation Protocol (SIP).

Figure 2:
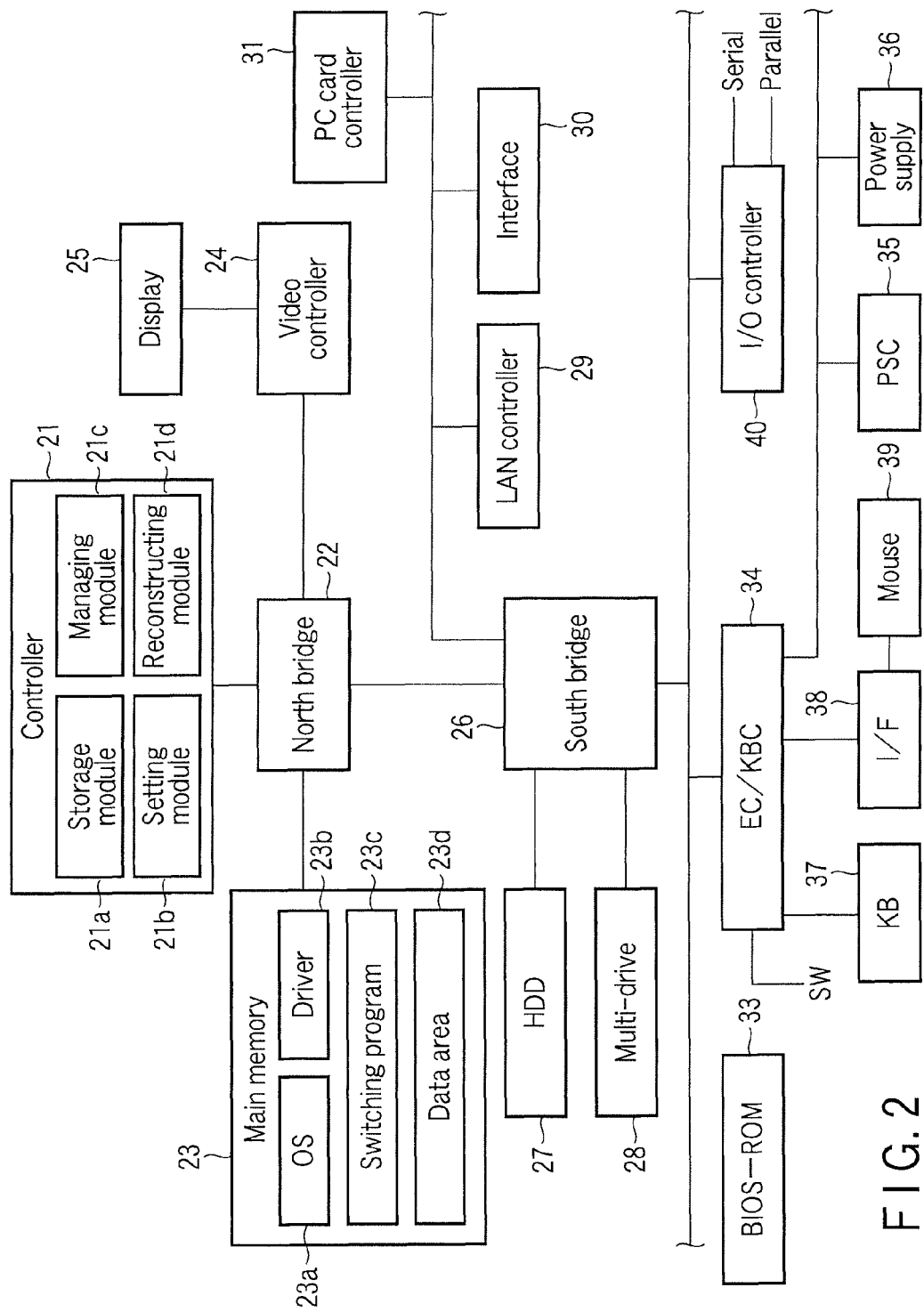
FIG. 2 is an exemplary functional block diagram showing an example of the switching apparatus according to the embodiment.

FIG. 2 is an exemplary functional block diagram showing an example of the switching apparatus 3 shown in FIG. 1.

The switching apparatus 3 includes, e.g., a controller 21, north bridge 22, main memory 23, video controller 24, display 25, south bridge 26, hard disk drive (HDD) 27, multi drive 28, LAN controller 29, interface 30, PC card controller 31, Basic Input/Output System ROM (BIOS ROM) 33, embedded controller/keyboard controller (EC/KBC) 34, power supply controller (PSC) 35, power supply 36, keyboard (KB) 37, mouse interface 38, mouse 39, and I/O controller 40.

The controller 21 controls the whole switching apparatus 3 by using a central processing unit (CPU) as a main component. The controller 21 uses the main memory 23 as a work area, and executes, e.g., an operating system (OS) 23a, driver 23b, and switching program 23c loaded from the HDD 27 into the main memory 23.

The north bridge 22 includes various controllers for controlling bridge processing between the controller 21 and south bridge 26, and controlling the main memory 23, video controller 24, and the like.

The video controller 24 is connected to the north bridge 22 via an accelerated graphics port (AGP), and controls data to be displayed on the display 25. The display 25 displays data supplied from the video controller 24 on the screen, and includes a liquid crystal display (LCD).

The south bridge 26 is connected to the north bridge 22 via a HUB link, and includes various controllers for controlling, e.g., various devices (e.g., the EC/KBC 34 and I/O controller) on a Low Pin Count (LPC) bus, various PCI devices (e.g., the LAN controller 29, interface 30, and PC card controller 31) on a Peripheral Component Interconnect (PCI) bus, disk drives corresponding to Integrated Drive Electronics (IDE), and USB devices.

The HDD 27 is connected as a device corresponding to primary IDE to the south bridge 26. The HDD 27 is a built in hard disk for storing, e.g., various programs such as the OS and switching program, and various data 23d. The multi drive 28 is connected as a device corresponding to secondary IDE to the south bridge 26, and drives a CD ROM, DVD ROM, and CD R/RW as removable recording media.

The LAN controller 29 is connected as a PCI device to the south bridge 26, has a communication function complying with the specifications of a wired LAN, and communicates with a communication apparatus having the same communication function.

The interface 30 is connected as a PCI device to the south bridge 26, has a communication function complying with the specifications of the LAN 100 and router 4, and performs an IP packet exchanging process.

The PC card controller 31 is connected as a PCI device to the south bridge 26, complies with the specifications of Personal Computer Memory Card International Association (PCMCIA), and controls various PC cards. The BIOS ROM 33 is connected to the LPC bus, and stores a Basic Input/Output System (BIOS) for mainly performing, e.g., a setting process on hardware in the switching apparatus 3 when the power supply is turned on. The EC/KBC 34 is connected to the LPC bus, and controls the power supply controller 35 and input devices such as the keyboard 37. The EC/KBC 34 is obtained by integrating an embedded controller (EC) and keyboard controller.

The power supply controller 35 is connected to the EC/KBC 34 via an I2C bus, and controls voltages to be applied to the individual units in the switching apparatus 3. The power supply 36 generates a driving power, and supplies the driving power to the individual units in the switching apparatus 3. The keyboard 37 is connected to the EC/KBC 34, and notifies the KBC of input signals corresponding to the pressing of various keys. The mouse interface 38 interfaces signals between the mouse 39 and EC/KBC 34. The mouse 39 is connected to the mouse interface 38, and performs input by a clicking operation and the like. The I/O controller 40 is connected to the LPC bus. The I/O controller 40 controls input/output of serial signals and parallel signals with respect to external devices, and also controls input/output with respect to the FDD 39.

In the switching apparatus 3 described above, the switching program 23c mapped on the main memory 23 under the control of the controller 21 implements the defined switching function in cooperation with, e.g., the LAN controller 29. The switching function of the switching apparatus 3 is implemented by loading the switching program 23c into a general purpose computer and executing the program. The switching apparatus 3 adopts a virtual memory system in which even when data is stored in physically discontinuous memory areas, these areas look like a continuous area from software (e.g., a process). Also, the switching apparatus 3 adopts a base address designation method for memory address designation.

The base address designation method is a method by which the sum of the value of a base address and the value of an address portion is used as a valid address. The start address of a program loaded into a memory is set in a base register, and the address (a relative position called an offset) of data when the start address of the program is address 0 is stored in the address portion of a CPU command. When executing an instruction, processing is performed using a valid address obtained by adding the value of the address portion to the value of the base register. This method can load a program into any area of a memory and execute the loaded program, without changing the value of the address portion of an instruction. This feature is called "relocation". That is, the switching program 23c is relocatably loaded in the virtual address space formed using the main memory 23.

The controller 21 includes, as its processing functions, a storage module 21a, setting module 21b, managing module 21c, and reconstruction module 21d.

The storage module 21a divides data pertaining to the switching function into a plurality of groups, and stores these data groups in the data area 23d of the main memory 23. The data area 23d is an area formed in the virtual memory space. The setting module 21b sets a base address allocated by the OS 23a for each of the plurality of data groups, when the switching program 23c is started up. The managing module 21c records and manages the base address and data size information of each data group when the switching program 23c is terminated. At the time of start up of the switching program 23c, the reconstruction module 21d refers to the base address and data size information recorded when the switching program 23c is terminated last time, and reconstructs data in the virtual memory space for each data group based on the result.

Figure 3:
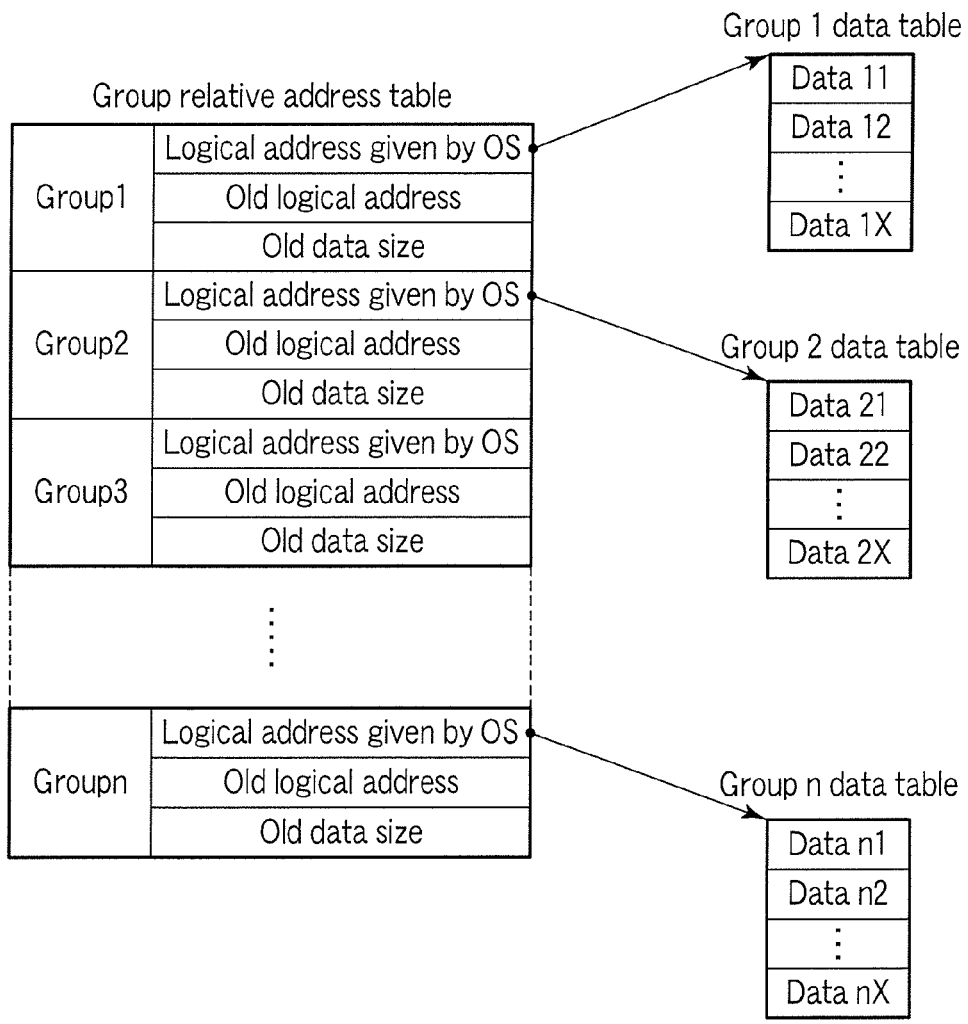
FIG. 3 is an exemplary view showing examples of data tables according to the embodiment.

FIG. 3 is an exemplary view showing examples of data tables pertaining to this embodiment. In this embodiment as shown in FIG. 3, data required for the switching program 23c to function is divided into a plurality of groups, i.e., group 1, group 2, . . . , group n in accordance with functions. For example, group 1 corresponds to extension line data, group 2 corresponds to trunk data, and group 3 corresponds to office line data.

Referring to FIG. 3, "Group relative address table" is a table describing a logical address, old logical address, and old data size given by the OS 23a. The logical address is a base address given by the OS 23a when the switching program 23c is started up this time. The old logical address is a base address given by the OS 23a when the switching program 23c is started up last time. Either base address is provided as a logical address in a virtual memory system. "Group 1 data table" to "Group n data table" indicate the contents of actual data of these groups, and are dynamically allocated as physical data to the data area 23d. That is, "Group 1 data table" to "Group n data table" are handled as a data portion required for the switching program 23c to function, and loaded together with a text portion (an area in which commands are described) of the switching program 23c into the main memory 23 when the switching program 23c is started up.

Referring to FIG. 3, when the system is started up, the setting module 21b sets a group 1 logical address given by the OS 23a in "Logical address given by OS 23a" in "Group relative address table". The reconstruction module 21d refers to the old logical address. If the old address is 0, the reconstruction module 21d determines that this is a new start up, and constructs data in the group 1 data table.

On the other hand, if an address is registered in the old address, i.e., if the old address is not 0, the reconstruction module 21d determines that this is a reboot, and compares the old base address and old data size recorded when the program is terminated last time with the present base address and data size for each group.

For example, if the comparison for group 1 shows that there is no difference, the group 1 data table is directly used. If there is a difference, the reconstruction module 21d reconstructs data in the group 1 data table. If the data size has increased, the reconstruction module 21d secures the group 1 data table in another area in the virtual memory, and constructs data. This processing is performed for all groups.

Figure 4:
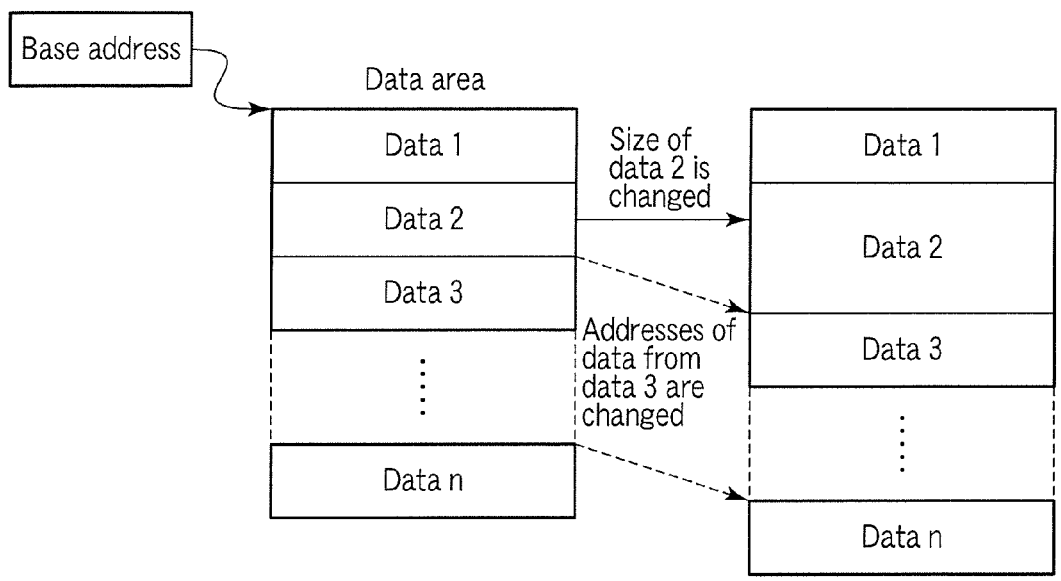
FIG. 4 is a conceptual view showing an existing data management method for comparison.

FIG. 4 is a conceptual view showing an existing data management method for comparison. This existing system collectively manages all data in a data area. The start addresses of data (data 1, data 2, ..., data n) are obtained by calculations based on a base address given to data 1 and the sizes of the data. In an architecture like this, if the size of, e.g., data 2 is changed, all addresses after that are changed, and this prolongs the start up time of the system.

By contrast, in this embodiment, data is managed as it is divided into a plurality of groups, and a base address is given to each group. This makes it possible to shorten the time required for address recalculations when the data size is changed, thereby shortening the system start up time.

Figure 5:
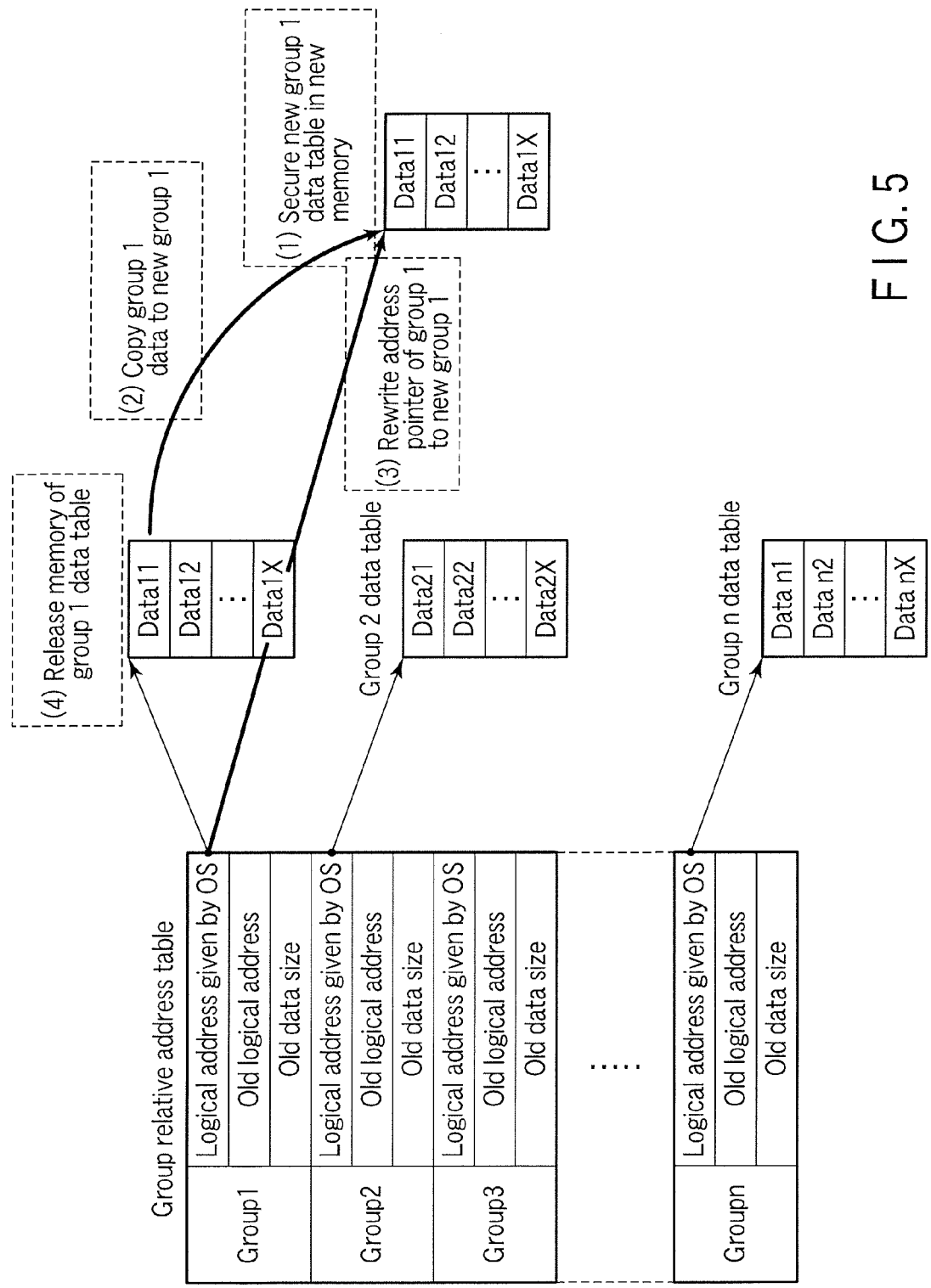
FIG. 5 is a view showing the procedure of processing when the number of resources of group data increases.

FIG. 5 is a view showing the procedure of processing when the number of resources of group data has increased. For example, when the number of resources of group 1 has increased, the processing is performed in the order of (1) to (4).

(1) A new memory area is secured as a group 1 data area. That is, the reconstruction module 21d requests the OS 23a to secure an unused area (an area in which neither a program nor data is allocated) in the virtual address space. In response to this request, the OS 23a secures an unused data area.

(2) Then, data of group 1 is copied to the secured data area. That is, the reconstruction module 21d copies data of group 1 at that point of time to the secured data area, and notifies the OS 23a of this data copy.

(3) Upon receiving this notification, the OS 23a instructs the reconstruction module 21d to change an address pointer to the group 1 data table into the address of the secured new data area.

(4) When this rewrite of the address pointer to the group 1 data table is complete, the reconstruction module 21d notifies the OS 23a of this completion. Upon receiving this notification, the OS 23a releases the memory area allocated to the original group 1 data.

The above mentioned procedure can update the virtual memory area without moving any group tables other than the group 1 table.

In this embodiment as described above, in data management of the switching program of the switching apparatus, data is stored as it is divided into some groups. A base address to be allocated to data by the OS 23a when the system is started up is set for each group. The old base address and old data size information allocated to each data group by the OS 23a are stored. When the system is rebooted, data in the group is reconstructed by referring to these pieces of information. In addition, if data or the number of resources in a group has increased, a necessary memory is additionally secured, and only the base address of the group containing the increase is changed.

As described above, data is divided into groups, and each group is given a relative address base. By referring to the old base address information and old data size information, a data area to be rewritten from an address allocated by a general purpose OS when the system is started up is reduced. This makes it possible to reduce the address rewrite time.

Furthermore, when data in a group has increased, a necessary memory area is secured in another area, and only the base address of the group containing the increase is changed. This makes it possible to minimize the change in address. From the foregoing, it is possible to provide a switching apparatus capable of shortening the start up time and a data management method of the same.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switching apparatus for implementing a switching function by a program relocatably loaded into a virtual memory space of a computer, comprising:
    a storage module configured to store data pertaining to the switching function by dividing the data into a plurality of groups;
    a setting module configured to set, for each of the plurality of groups, a base address to be allocated by an operating system when the program is started up;
    a managing module configured to record and manage the base address and data size information of each group when the program is terminated; and
    a reconstruction module configured to, when the program is started up, refer to the base address and the data size information of each group recorded when the program is terminated last time, and configured to reconstruct data in the virtual memory space for each of the plurality of groups based on a reference result.

2. The apparatus of claim 1, wherein for a group for which the reference result indicates that data size has increased, the reconstruction module changes the base address, secures an area in the virtual memory space, and reconstructs increased data in the secured area.

3. A data management method of a switching apparatus for implementing a switching function by a program relocatably loaded into a virtual memory space of a computer, comprising:

storing data pertaining to the switching function by dividing the data into a plurality of groups;

setting for each of the plurality of groups, a base address to be allocated by an operating system when the program is started up;

recording and managing the base address and data size information of each group when the program is terminated; and referring when the program is started up, to the base address and the data size information of each group recorded when the program is terminated last time, and reconstructing, by the computer, data in the virtual memory space for each of the plurality of groups based on a reference result.

4. The method of claim 3, wherein for a group for which the reference result indicates that data size has increased, the reconstructing comprises changing the base address, securing an area in the virtual memory space, and reconstructing increased data in the secured area.

* * * * *